(12) United States Patent
Song et al.

(10) Patent No.: US 12,494,057 B2
(45) Date of Patent: Dec. 9, 2025

(54) RAPID DROUGHT MONITORING AND IDENTIFICATION METHOD FOR WINTER WHEAT BASED ON UAV MEASUREMENTS OF LEAF AREA INDEX

(71) Applicant: China Institute of Water Resources and Hydropower Research, Beijing (CN)

(72) Inventors: Wenlong Song, Beijing (CN); Hongjie Liu, Beijing (CN); Hanyu Liu, Beijing (CN); Yangjun Shi, Beijing (CN); Xuecheng Xing, Beijing (CN); Yizhu Lu, Beijing (CN); Jian Li, Beijing (CN); Lin Lin, Beijing (CN); Wenjing Lu, Beijing (CN); Xiuhua Chen, Beijing (CN); Rongjie Gui, Beijing (CN)

( * ) Notice: Subject to any disclaimer, the term of this patent is extended or adjusted under 35 U.S.C. 154(b) by 0 days.

(21) Appl. No.: 19/001,469

(22) Filed: Dec. 25, 2024

(65) Prior Publication Data

US 2025/0131716 A1    Apr. 24, 2025

Related U.S. Application Data

(63) Continuation of application No. PCT/CN2023/119396, filed on Sep. 18, 2023.

(30) Foreign Application Priority Data

Sep. 20, 2022  (CN) .......................... 202211147826.1

(51) Int. Cl.
*G06V 20/10* (2022.01)
*G06V 20/17* (2022.01)

(52) U.S. Cl.
CPC ............ *G06V 20/188* (2022.01); *G06V 20/17* (2022.01); *G06V 20/194* (2022.01)

(58) Field of Classification Search
CPC .... G06V 20/188; G06V 20/17; G06V 20/194; G06V 20/10; G06V 10/28; G06V 10/766
See application file for complete search history.

(56) References Cited

U.S. PATENT DOCUMENTS

2019/0230875 A1    8/2019  Mewes et al.

FOREIGN PATENT DOCUMENTS

| CN | 111798327 A | 10/2010 |
| CN | 102176002 A | 9/2011 |

(Continued)

OTHER PUBLICATIONS

Han, Xin, et al. "Inversion of winter wheat growth parameters and yield under different water treatments based on UAV multispectral remote sensing." Frontiers in plant science 12 (2021): 609876. (Year: 2021).*

(Continued)

*Primary Examiner* — Vu Le
*Assistant Examiner* — Tracy Mangialaschi (57) ABSTRACT

A rapid monitoring and identification method for winter wheat drought levels includes: 1) obtaining multispectral images and ground-measured LAI through UAV-based multi-payload low-altitude remote sensing technology, and calculating vegetation indices such as Normalized Difference Vegetation Index (NDVI), Difference Vegetation Index (DVI), Ratio Vegetation Index (RVI), Enhanced Vegetation Index (EVI), Optimized soil adjusted vegetation index (OSAVI) and Transformed Chlorophyll Absorption Reflectance Index; 2) establishing regression equations between the calculated vegetation indices and measured LAI for different growth stages, and selecting the optimal model equation for each growth stage; 3) using the optimal model equation to invert the LAI of winter wheat at various growth stages, and calibrating the LAI thresholds for different (Continued)

drought stress levels; 4) acquiring the multispectral images of target plot through real-time monitoring, calculating the required vegetation indices, inverting to obtain the LAI value, and comparing it with the threshold to determine the current drought stress level.

4 Claims, 6 Drawing Sheets

(56) References Cited

FOREIGN PATENT DOCUMENTS

| | | | | | |
|---|---|---|---|---|---|
| CN | 106780079 | A | * | 5/2017 | ............. G06Q 50/02 |
| CN | 108662991 | A | | 10/2018 | |
| CN | 110222475 | A | | 9/2019 | |
| CN | 111965117 | A | | 11/2020 | |
| CN | 112991247 | A | * | 6/2021 | ......... G06K 9/00657 |
| CN | 113869173 | A | | 12/2021 | |
| CN | 114441457 | A | | 5/2022 | |
| CN | 115641502 | A | | 1/2023 | |
| JP | 2021190108 | A | | 12/2021 | |
| WO | 2022166939 | A1 | | 8/2022 | |

OTHER PUBLICATIONS

Internation Search Report of PCT/CN2023/119396, Mailed Dec. 21, 2024.

Pan, Ying, "Non-official translation: Research on Remote Sensing Quantitative Inversion of Vegetation Coverage and Management Measure Factors Based on Prosail Model and Multiangle Data", Chinese Master's Dissertations Full-text Database, Basic Sciences, No. 07, Jul. 15, 2022, pp. A006-A126.

Sadeghi. Y. et al., "Mapping boreal forest biomass from a SRTM and TanDEM-X based on canopy height model and Landsat spectral indices", International Journal of Applied Earth Observation and Geoinformation, Feb. 28, 2018, pp. 1-31.

Qu Wei et al., "Research on the application of remote sensing technology in the management and supervision of small and medium rivers", Water Resources and Hydropower Engineering, vol. 52, No. 7, Jul. 31, 2021, pp. 23-32.

Kuang Zhaomin et al., "Application of multi-source satellite data in monitoring sugarcane droughts", Chinese Journal of Agrometeorology, vol. 28, No. 1, Dec. 31, 2007, pp. 93-96.

Jiang Fugen, "Inversion Study on Optimized kNN Method of Vegetation Leaf Area Index", Master's Academic Thesis, (May 2020).

* cited by examiner

RAPID DROUGHT MONITORING AND IDENTIFICATION METHOD FOR WINTER WHEAT BASED ON UAV MEASUREMENTS OF LEAF AREA INDEX

TECHNICAL FIELD

The present invention belongs to the technical field of drought monitoring, particularly relating to the monitoring of drought levels in winter wheat, and specifically to a rapid UAV-based monitoring and identification method for winter wheat drought based on LAI.

BACKGROUND

Drought is a major natural factor affecting crop growth, development, and yield. Prolonged, widespread drought can lead to significant reductions in crop production. Precipitation is the primary source of water for crop growth and development. In China, winter wheat primarily relies on natural precipitation to supply the water required for its growth. Water deficiency can disrupt the normal physiological metabolic processes of winter wheat, hinder its normal growth and development, and ultimately reduce yield. Currently, most regions still employ traditional flood irrigation methods, which result in uneven irrigation and low water resource utilization efficiency. The water requirements of winter wheat vary at different growth stages. During the emergence and overwintering stages, the plants are small and grow slowly, requiring relatively little water. However, during the jointing stage, the plants begin to grow taller, and their water demand increases significantly: From the heading stage to the grain-filling stage, the plants enter a period of rapid growth and become highly sensitive to water availability: any water deficiency during this period can have severe consequences. Plant cells absorb water and other substances, undergo division and expansion, and complete the processes of growth and development, which involve numerous physiological and biochemical factors and their interactions. Under drought stress, the developmental functions of plant cells are restricted, and the flow rate of water into elongating cells decreases. As a result, the plant's height and leaf area are inhibited, ultimately affecting the accumulation of dry matter. Additionally, under drought stress, the plant's leaves may drop, with older leaves being more prone to senescence, leading to a reduction in the LAI.

Therefore, timely irrigation based on the varying water requirements of winter wheat is crucial to ensure normal plant growth. During the growth and development of winter wheat, soil moisture conditions can reflect the water status of the plants. If soil moisture is insufficient, the physiological water requirements of the crop cannot be met, which will severely impact the normal growth, development, and productivity of the crop. These effects are specifically reflected in physiological parameters and external morphology: However, the variations in these parameters are highly complex, and relying solely on manual observation is time-consuming, labor-intensive, and lacks spatial representativeness. Additionally, manual methods can easily damage the plants, making it challenging to conduct long-term, effective, and high-precision monitoring of vegetation.

Currently, there are two main approaches for monitoring drought levels in winter wheat. The first is based on soil moisture data collected at monitoring sites. Its advantage is that it can accurately reflect drought levels around the site: however, the density of observation stations is limited, and the availability of long-term series data for the region is insufficient, making it difficult to capture the spatial characteristics of crop drought. The second approach uses remote sensing technology to construct indices that reflect the growth status of crops for drought monitoring. Remote sensing technology can effectively capture changes in soil moisture and provides rapid, efficient, and non-destructive acquisition of drought information. However, remote sensing images are influenced by factors such as resolution, weather conditions, and revisit cycles, which can lead to data loss, temporal discontinuities, and low spatial resolution. These issues make remote sensing unsuitable for acquiring high-frequency agricultural information at a regional scale.

Crop monitoring based on UAV remote sensing has become a major focus of research. UAVs can provide high-resolution remote sensing data at any time, offering significant advantages in terms of fine-scale precision and dynamic continuous monitoring of farmland. UAV-based low-altitude remote sensing technology enables rapid and convenient monitoring services for agricultural fields, providing an efficient solution for information collection in large-scale cropping areas.

Low-altitude remote sensing monitoring based on UAV platforms has unique technical advantages, including regional monitoring, high temporal and spatial resolution, operation below cloud cover, flexibility, low cost, and rapid efficiency. These features enable fine-scale precision and dynamic continuous monitoring of farmland, and UAV technology is now widely applied in drought monitoring. However, existing UAV-based drought monitoring efforts are primarily focused on orchards, with relatively less application in monitoring field crops. Factors such as planting spacing and different canopy structures can impact water monitoring performance, which limits the ability to meet the needs of precision agriculture irrigation. Currently; UAV-based low-altitude remote sensing is being employed for monitoring winter wheat, but studies on defining LAI thresholds for different drought levels are relatively limited, and there are still gaps in addressing crop irrigation requirements effectively.

SUMMARY OF THE INVENTION

The objective of the present invention is to address the aforementioned technical shortcomings by proposing a rapid UAV-based monitoring and identification method for winter wheat drought levels using the LAI. This method aims to enhance detection accuracy and monitoring efficiency under varying drought levels.

The objective of the present invention is achieved as follows:

A rapid UAV-based monitoring and identification method for winter wheat drought levels based on LAI, comprising the following steps:

1) Data Collection: This involves acquiring multispectral image data using UAV-based multi-payload low-altitude remote sensing technology and ground-measured LAI data. Vegetation indices, including NDVI, DVI, RVI, EVI, OSAVI, and TCARI, are calculated from the multispectral image data.

2) Constructing LAI Inversion Models for Different Growth Stages of Winter Wheat under Varying Drought Levels: The NDVI-Otsu method is used to remove soil background pixels (after calculating NDVI, the Otsu method is applied to determine the threshold for binarizing wheat and soil background). Pure canopy vegetation index pixel values of winter wheat are extracted. Vegetation indices, including NDVI, DVI, RVI, EVI, OSAVI, and TCARI, are used to construct four types of regression equations with the measured LAI at different growth stages. The regression equation with the highest correlation to the LAI for each growth stage is selected as the optimal model equation for that specific growth stage. The different growth stages refer to the following stages of winter wheat: jointing to heading, heading to grain filling, and filling to maturity: The four types of regression equations include linear regression, exponential regression, logarithmic regression, and polynomial regression.

3) Calibration of LAI Thresholds for Different Drought Levels: Based on the optimal model equations obtained in Step 2) for each growth stage, the LAI is inverted for each stage, and the LAI threshold ranges for different drought levels are calibrated.

4) Real-Time Drought Level Identification: Multispectral images of the target plot are obtained through real-time monitoring, and the required vegetation indices are calculated. These vegetation indices are then applied to the optimal model equation for the corresponding growth stage, as determined in Step 2), to invert and obtain the LAI value. The resulting LAI value is then compared with the threshold ranges established in Step 3) for that specific growth stage to determine the real-time drought severity level.

Further Optimization: In Step 1), the acquisition of multispectral image data is carried out using an FL-81 quadrotor UAV equipped with a MicaSense RedEdge-M™ multispectral camera to capture aerial multispectral images. The flight altitude is set at 55 m, resulting in a ground resolution of 4 cm. The camera captures wavelengths in the blue, green, red, red-edge, and near-infrared bands. Further, in Step 1), the ground-measured LA is obtained using the LI-COR portable plant canopy analyzer LAI-2200C. For each plot, 22 measurements are taken, and these 22 values are used as input data to calculate the LAI.

Further, in Step 2), the optimal model equation for the jointing-heading stage is a polynomial regression equation between DVI and LAI, the optimal model equation for the heading-filling stage is a polynomial regression equation between NDVI and LAI, and the optimal model equation for the filling-maturity stage is a polynomial regression equation between RVI and LAI. Here, LAI represents the leaf area index.

Further, in Step 3), the calibrated LA thresholds for different drought levels are as follows: For the jointing-heading stage: Normal: LAI>2.8; Mild drought: 2.3 to 2.8; Moderate drought: 1.7 to 2.3; Severe drought: LAI<1.7. For the heading-filling stage: Normal: LAI>4.2: Mild drought: 3.6 to 4.2; Moderate drought: 3.2 to 3.6; Severe drought: LAI<3.2. For the filling-maturity stage: Normal: LAI>5.17: Mild drought: 4.74 to 5.17; Moderate drought: 4.3 to 4.74; Severe drought: LAI<4.3.

Further, in Step 3), the calibration method for determining the LAI thresholds for different drought levels is as follows: First, calculate the average value of the inversion results for each drought level plot. Then, calculate the median value between the averages of two adjacent drought levels, which is used as the threshold between those adjacent drought levels.

The advantages and beneficial effects of the present invention are:

The method proposed in this invention is based on UAV multispectral remote sensing imagery and provides high accuracy in monitoring and identifying drought levels at different growth stages of winter wheat. The method is flexible, stable, and rapid. By conducting comparative analysis, it determines the optimal LAI inversion models for different growth stages of winter wheat and calibrates the threshold ranges for LAI under varying drought stress levels during each growth stage. This approach enables rapid and highly accurate monitoring and identification of drought levels in winter wheat.

BRIEF DESCRIPTION OF THE DRAWINGS

The following provides a further explanation of the present invention in conjunction with the accompanying drawings and embodiments.

DETAILED DESCRIPTION OF THE INVENTION

Embodiment 1

A rapid drought monitoring and identification method for winter wheat based on UAV measurements of leaf area index.

Selection of Study Area and Preliminary Preparations:

The study area in this example is located in the Donglei Irrigation District (Phase II) of Fuping County, Weinan City, Shaanxi Province (109° 10'–110° 10'E, 34°41'–35° 00'N). This region lies in the eastern part of the Guanzhong area of Shaanxi Province, to the west of the Yellow River and to the north of the Weihe River, within the northern part of the Loess undulating plateau region. The elevation ranges from 385 m to 635 m. The irrigation district borders the Yellow River to the east, extends to Fuping County town in the west, is adjacent to the "Jiaokou Pumped Irrigation District of Shaanxi Province" and "Luohui Canal Irrigation District of Weinan City" in the south, and is bordered by Qiao Mountain in the north, with terrain that is high in the northwest and low in the southeast. The main landform types include floodplain areas and plateau regions. The area has a temperate continental monsoon climate, characterized by cold and dry winters and hot, rainy summers, with more than 50% of the annual rainfall concentrated in the summer. The average annual rainfall ranges from 519 mm to 552 mm, which is significantly lower than the average annual evaporation (1700 mm to 2000 mm). Rainfall often occurs in the form of heavy rain or continuous overcast rain, typically occurring in July, August, and September, making this region a typical semi-arid area. The total area of the irrigation district is 1469.81 km², with wheat and corn being the primary crops grown in the region. The soil in the irrigation area is silty loam, with an average volumetric field capacity of 29.5% and an average bulk density of 1.48 g/cm³.

(1) Plot Design

Figure 1:
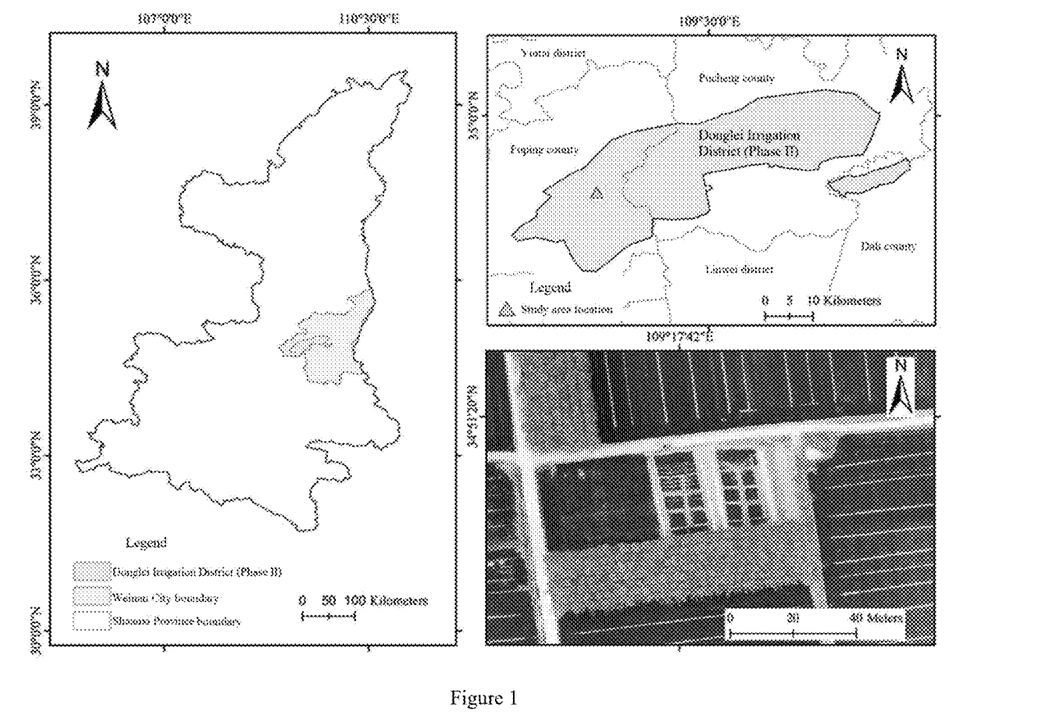
FIG. 1 shows the general overview of the study area in Example 1 of the present invention.
Figure 2:
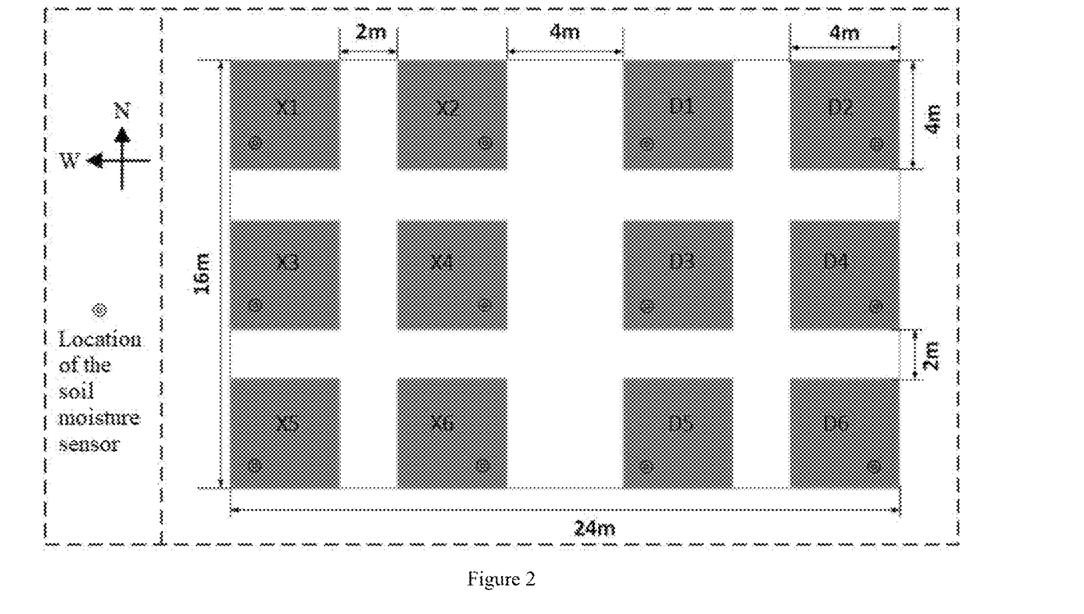
FIG. 2 shows the plot design of the study area in Example 1 of the present invention.

The experimental plots were selected in open fields with flat terrain, where the groundwater table is deeper than 2 m, and both drainage and irrigation are available. Two plots, each with an area of 10 m×16 m, were used. Above each plot, an openable rain-shelter structure was constructed to eliminate the effects of precipitation. The plot was evenly divided into 11 smaller subplots, each measuring 4 m×4 m. To ensure the proper implementation of the water control experiment, a 2 m buffer zone was maintained between the subplots to prevent seepage, and the subplots were isolated accordingly (FIG. 2). 11 soil moisture sensor sets were installed in the experimental field, configured to collect data every ten minutes and store the data every half hour. The experimental winter wheat variety planted was "Weilong 169," which was sown on Oct. 23, 2020. The planting was done mechanically with an inter-row spacing of approximately 12-15 cm. Basal fertilizer was applied after sowing, and chemical herbicides and insecticides were used throughout the growth period. During the growth of the winter wheat, conventional field management practices were carried out, following local farmers' management measures.

(2) Water Control Design

The whole growth period of winter wheat was divided into three growth stages, with each growth stage being specifically named and detailed in Table 1. Soil moisture probes with the embedded depths of 10 cm, 20 cm and 40 cm are buried in each plot and are used for measuring the soil relative humidity of different depths, and different drought stress level were set based on the soil moisture at the position of 20 cm.

To ensure uniform germination, all plots were irrigated equally prior to the jointing stage of winter wheat. Water treatments began at the jointing stage and continued until winter wheat maturity. During each growth stage, five levels of drought treatment were applied (normal, mild drought, moderate drought, severe drought, and extreme drought). The drought stress levels for winter wheat were classified according to the "Technical Specifications for Field Investigation and Leveling of Winter Wheat Disasters—NY/T 2283-2012". The irrigation upper and lower limits required to maintain the soil moisture for each drought level were determined based on the percentage of the field capacity (29.5%).

The rapid drought monitoring and identification method specifically includes the following steps:

1) Data Collection: This includes acquiring multispectral image data using UAV-based multi-payload low-altitude remote sensing technology and ground-measured LAI data: multi-spectral image data were used to calculate NDVI, DVI, RVI, EVI, OSAVI and TCARI vegetation indicators. The acquisition of the multispectral image data is conducted using an FL-81 quadrotor UAV equipped with a multispectral camera to capture multispectral aerial images. The flight altitude is set at 55 meters, resulting in a ground resolution of 4 cm. The camera captures wavelengths in the blue band, green band, red band, red-edge band, and near-infrared band. Using the LI-COR portable plant canopy analyzer LAI-2200C, 22 measurements are taken for each plot during each session, and these 22 measurement values are used as input data to calculate the LAI. In this embodiment, the calculation of each vegetation index is performed using the formulas provided in Table 2.

TABLE 2

| Calculation formula of vegetation index | |
|---|---|
| Vegetation Index | Formula |
| NDVI | $NDVI = \dfrac{NIR - R}{NIR + R}$ |
| DVI | $DVI = NIR - R$ |
| RVI | $RVI = \dfrac{NIR}{R}$ |
| EVI | $EVI = \dfrac{2.5(NIR - R)}{NIR + 6R - B + 1}$ |
| OSAVI | $OSAVI = \dfrac{(1 + 0.16)(NIR - R)}{NIR + R + 0.16}$ |
| TCARI | $TCARI = 3[RE - R) - 0.2(RE - G)\left(\dfrac{RE}{R}\right)]$ |

Note:
NIR, near infrared band reflectance; R, red band reflectance; B, blue band reflectance; RE, red edge band reflectance; G, green band reflectance.

2) Constructing LAI Inversion Models for Different Growth Stages of Winter Wheat under Varying Drought Levels: The collaborative registration NDVI-Otsu method is used to remove the soil background, extracting pure canopy vegetation index pixel values of winter wheat. The vegetation indices NDVI, DVI, RVI, EVI, OSAVI, and TCARI are each used to construct 4 types of regression equations with the measured LAI at different growth stages. For each growth stage, the regression equation that has the highest correlation with LAI is selected as the optimal model

TABLE 1

| Winter Wheat Water Control Scheme | | | | | | |
|---|---|---|---|---|---|---|
| | Soil relative water content | | | Soil relative humidity (%) | | |
| Drought levels | Jointing - heading stage | Heading - filling stage | Filling - maturity stage | Jointing - heading stage | Heading - filling stage | Filling - maturity stage |
| Dro1 | 65-70% | 65-70% | 60-65% | 19.2-20.7 | 19.2-20.7 | 17.7-19.2 |
| Dro2 | 60-65% | 60-65% | 55-60% | 17.7-19.2 | 17.7-19.2 | 16.2-17.7 |
| Dro3 | 55-60% | 50-60% | 45-55% | 16.2-17.7 | 14.8-17.7 | 11.8-16.2 |
| EDro | <55% | <55% | <45% | <16.2 | <16.2 | <11.8 |
| Nor | >70% | >70% | >65% | >20.7 | >20.7 | >19.2 | equation for that stage. The different growth stages refer to the following stages of winter wheat: jointing to heading, heading to grain filling, and grain filling to maturity. The 4 types of regression equations include linear regression, exponential regression, logarithmic regression, and polynomial regression.

The vegetation indices NDVI, DVI, RVI, EVI, OSAVI, and TCARI are calculated from the multispectral data at different growth stages and then subjected to regression analysis with the measured LAI values. This results in four types of regression models—linear regression, exponential regression, logarithmic regression, and polynomial regression algorithms—for the three growth stages under different drought levels.

Figure 3:
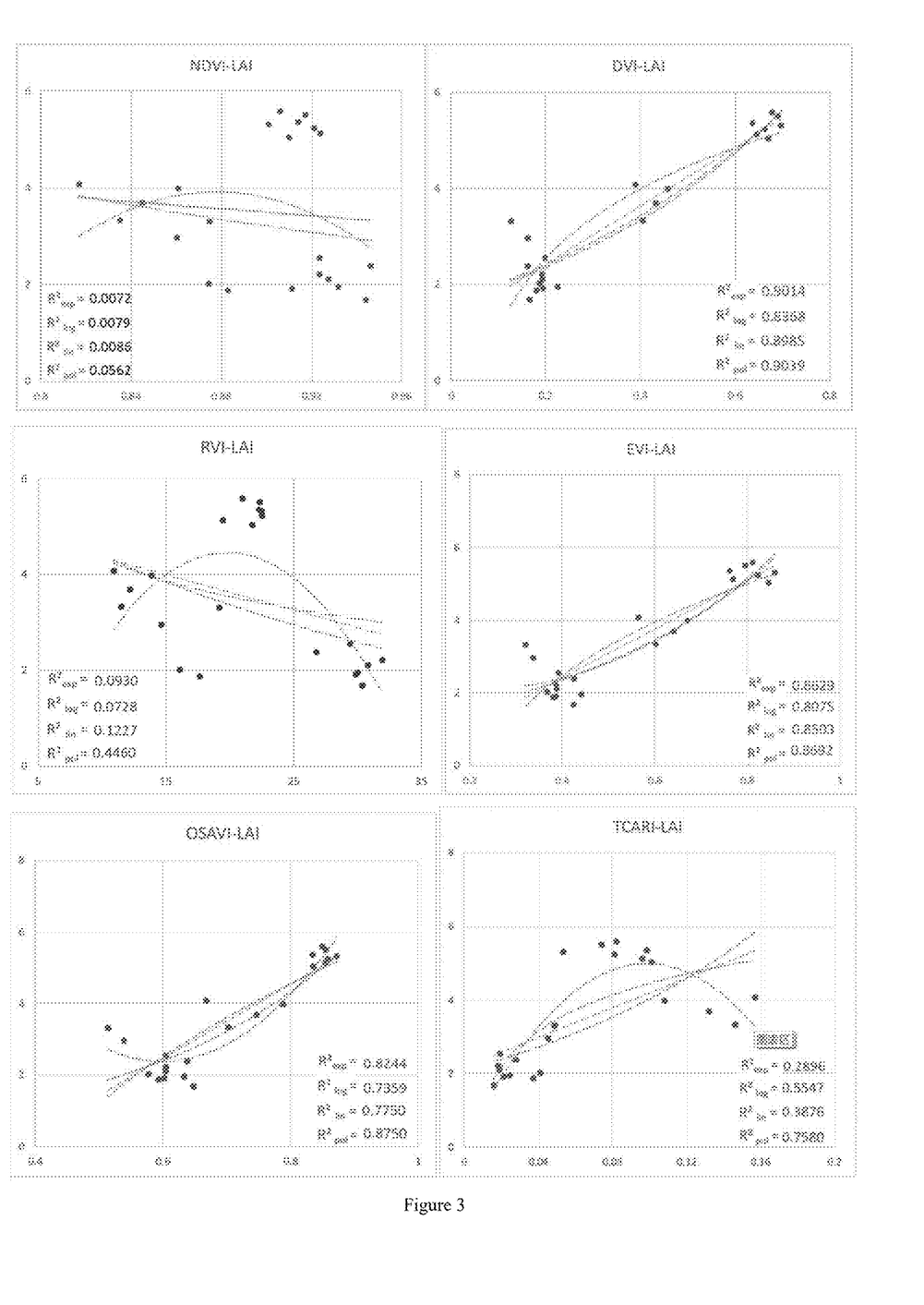
FIG. 3 illustrates the correlation between various vegetation indices and LAI for the four models during the jointing-heading stage in Example 1 of the present invention.
Figure 4:
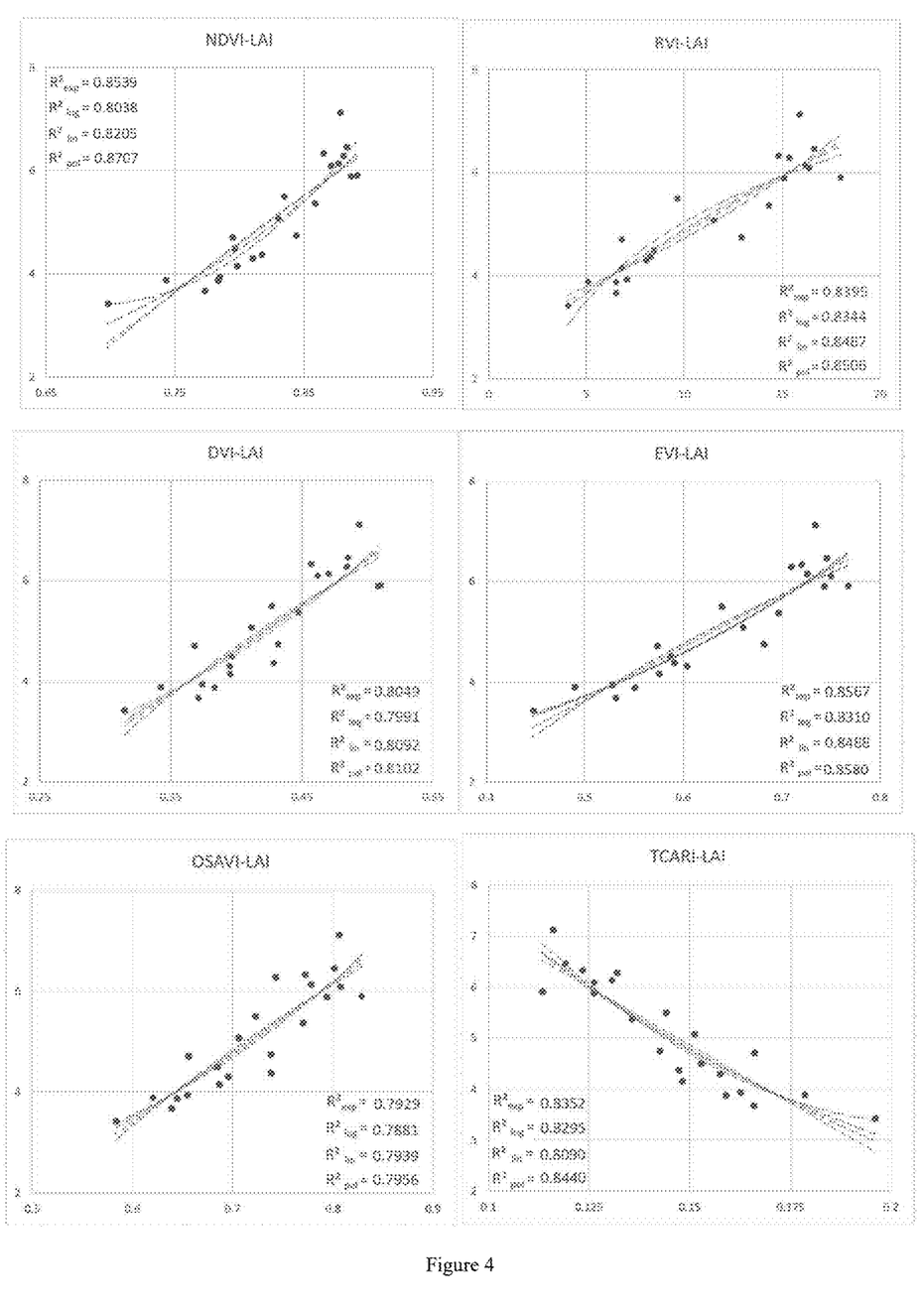
FIG. 4 shows the correlation between various vegetation indices and LAI for the four models during the heading-filling stage in Example 1 of the present invention.
Figure 5:
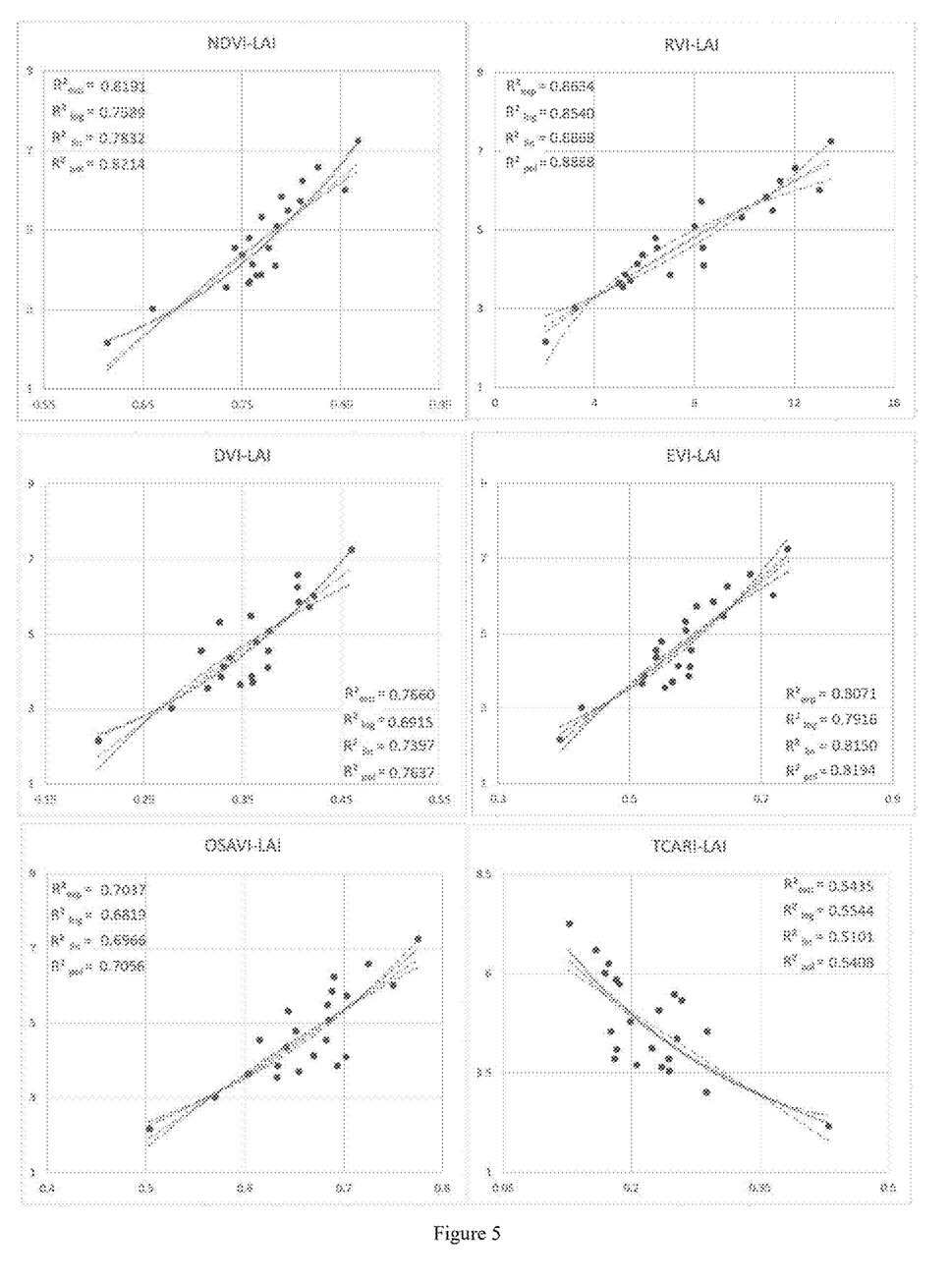
FIG. 5 shows the correlation between various vegetation indices and LAI for the 4 models during the grain-maturity stage in Example 1 of the present invention.

As shown in FIGS. 3 to 5, at each growth stage of winter wheat, regardless of which vegetation index is used in the LAI inversion model, the polynomial regression consistently exhibits the highest inversion accuracy. During the jointing-heading stage of winter wheat, the DVI-LAI model demonstrates the highest overall inversion accuracy: The exponential regression model and the polynomial regression model also exhibit high inversion accuracy, with $R^2$ values reaching 0.90. The $R^2$ values of the logarithmic regression model and the linear regression model are also above 0.83. Next, the EVI-LAI model and the OSAVI-LAI model also show relatively satisfactory overall inversion accuracy. For the EVI-LAI model, the polynomial regression model has the highest accuracy, with an $R^2$ of 0.87. The inversion accuracy of the linear regression model, exponential regression model, and logarithmic regression model are all above 0.80. For the OSAVI-LAI model, the polynomial regression model also has the highest accuracy, with an $R^2$ value of 0.88. The inversion accuracy of the linear regression model, exponential regression model, and logarithmic regression model are all above 0.73. The TCARI-LAI model shows relatively average inversion accuracy: The polynomial regression model has slightly better accuracy, with an $R^2$ value of 0.76, whereas the inversion accuracy of the linear regression model, exponential regression model, and logarithmic regression model are all below 0.56. The NDVI-LAI model and RVI-LAI model both exhibit relatively low inversion accuracy. For the RVI-LAI model, the polynomial regression model has the highest accuracy, with an $R^2$ value of 0.45. The inversion accuracy of the linear regression model, exponential regression model, and logarithmic regression model are all below 0.13. For the NDVI-LAI model, the overall inversion accuracy is the lowest. The $R^2$ values of the linear regression model, exponential regression model, and logarithmic regression model are all below 0.01, and the $R^2$ value for the polynomial regression model is only 0.06.

During the heading-filling stage of winter wheat, the NDVI-LAI model demonstrates the highest overall inversion accuracy: The polynomial regression model exhibits the highest accuracy, with an $R^2$ value of 0.87, while the $R^2$ values of the linear regression model, exponential regression model, and logarithmic regression model are all above 0.80. Next, the EVI-LAI model, RVI-LAI model, and TCARI-LAI model also show relatively high inversion accuracy. For all three vegetation indices, the polynomial regression model has the highest accuracy, with $R^2$ values above 0.84. For the EVI-LAI and RVI-LAI models, the logarithmic regression model has the lowest inversion accuracy; with an $R^2$ value of 0.83. For the TCARI-LAI model, the linear regression model has the lowest accuracy, with an $R^2$ value of 0.81. For the DVI-LAI and OSAVI-LAI models, the overall inversion accuracy is slightly lower compared to the other models. The polynomial regression model still shows the highest accuracy, with $R^2$ values exceeding 0.80. The logarithmic regression model has the lowest inversion accuracy, but its $R^2$ value still exceeds 0.78. The OSAVI-LAI model has the lowest overall inversion accuracy among all models.

During the grain-filling to maturity stage of winter wheat, the RVI-LAI model demonstrates the highest overall inversion accuracy. The polynomial regression model has the highest accuracy, with an $R^2$ value of 0.89. The linear regression model also shows relatively good accuracy, with an $R^2$ value of 0.88, the $R^2$ values for both the exponential regression model and logarithmic regression model exceed 0.85. Next, the NDVI-LAI model and EVI-LAI model also exhibit relatively high inversion accuracy: The polynomial regression model shows the highest inversion accuracy for both, with an $R^2$ value of 0.82. The logarithmic regression model has the lowest in version accuracy, with $R^2$ values of 0.76 and 0.79, respectively. The DVI-LAI model and OSAVI-LAI model demonstrate average inversion accuracy. The polynomial regression model and the exponential regression model have slightly higher accuracy, with $R^2$ values of approximately 0.76 and 0.70, respectively. The $R^2$ values for the linear regression model and logarithmic regression model are also above 0.68. For the TCARI-LAI model, the overall inversion accuracy is relatively unsatisfactory. The $R^2$ value for the logarithmic model is 0.55, while the $R^2$ values for both the polynomial regression model and exponential regression model are 0.54, and the $R^2$ value for the linear regression model is 0.51.

TABLE 3

Optimal Regression Equations for Vegetation Indices and LAI at Different Growth Stages

| Stage | Vegetation Indices | Model Equation |
|---|---|---|
| Jointing - heading stage | DVI | $Y = 4.0911*x^2 + 2.6713*x + 1.7132$ |
| Heading - filling stage | NDVI | $Y = 77.977*x^2 - 107.62*x + 40.55$ |
| Filling - maturity stage | RVI | $Y = -0.0055*x^2 + 0.4608*x + 1.4066$ |

Note:
x represents the vegetation index, and y represents the inverted LAI.

3) Calibration of LAI Thresholds for Different Drought Levels: Based on the optimal model equations obtained in Step 2) for each growth stage, the LAI is inverted for each stage, and the LAI thresholds for different drought levels are calibrated. Using the UAV multispectral images acquired by the Feilong-81, the LAI of the crops is inverted, and the drought severity is classified according to the calibrated thresholds listed in Table 4.

TABLE 4

Calibrated LAI Thresholds for Different Drought Levels of Winter Wheat Based on UAV Multispectral Data

| Stage | Normal | Mild drought | Moderate drought | Severe drought |
|---|---|---|---|---|
| Jointing-heading stage | >2.8 | 2.3~2.8 | 1.7~2.3 | <1.7 |
| Heading-filling stage | >4.2 | 3.6~4.2 | 3.2~3.6 | <3.2 |
| Filling - maturity stage | >5.17 | 4.74~5.17 | 4.3~4.74 | <4.3 |

4) Real-Time Drought Level Identification: Multispectral images of the target plot are acquired through real-time monitoring, and the required vegetation indices are calculated. These vegetation indices are then applied to the optimal model equation for the corresponding growth stage, as determined in Step 2), to invert and obtain the LAI value. The obtained LAI value is then compared with the threshold values established in Step 3) for that specific growth stage to determine the real-time drought severity level.

Figure 6:
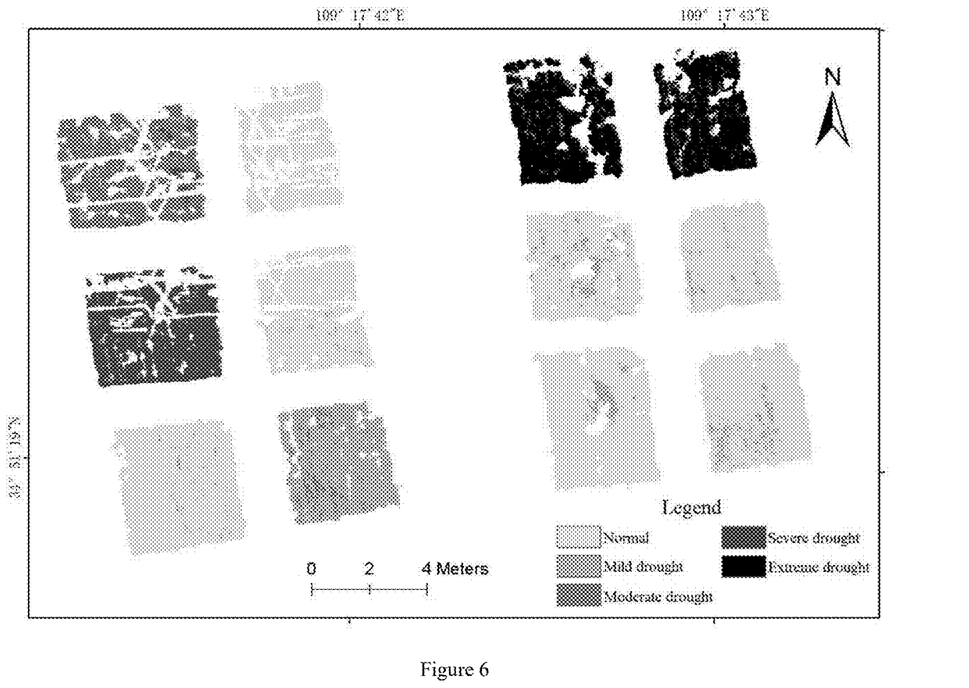
FIG. 6 shows the classification results for winter wheat drought severity based on the inverted LAI indicator during the jointing-heading stage.
Figure 7:
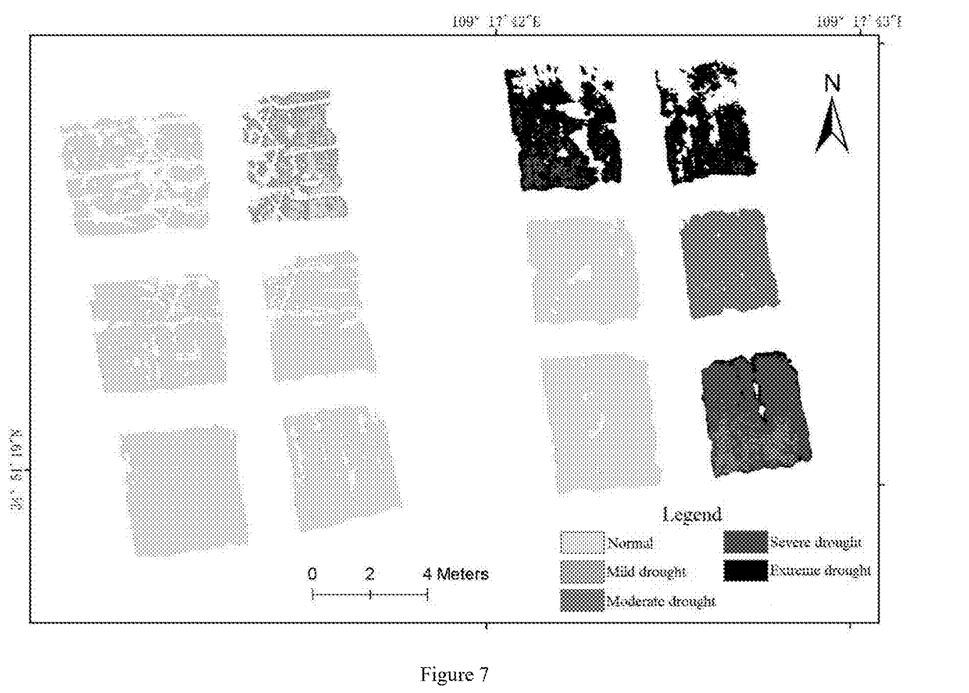
FIG. 7 shows the classification results for winter wheat drought severity based on the inverted LAI indicator during the heading-filling stage.
Figure 8:
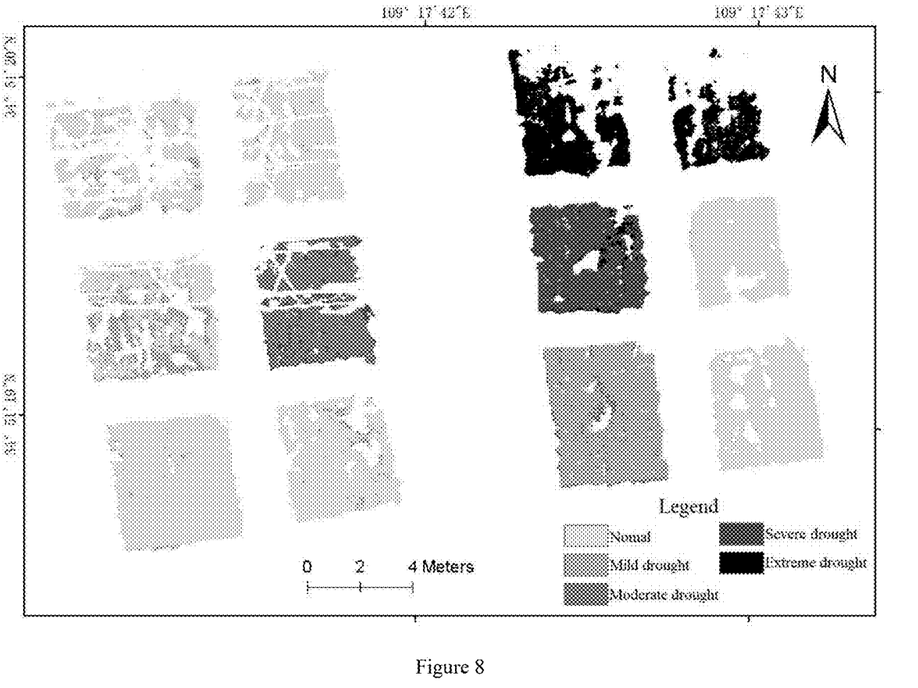
FIG. 8 shows the classification results for winter wheat drought severity based on the inverted LAI indicator during the grain-maturity stage.

As shown in FIGS. 6 to 8, during the jointing-heading stage, plots X6, X1, and X2 are identified as being under mild, moderate, and severe drought stress, respectively, while plots D1 and D2 are identified as being under extreme drought stress. This is consistent with the experimental design in practice. It can be concluded that the DVI polynomial model can effectively estimate the LAI of winter wheat during the jointing-heading stage and can be used to monitor drought stress levels during this stage based on the calibrated thresholds. During the heading-filling stage, plots X2, D4, and D6 are identified as being under mild, moderate, and severe drought stress, respectively, while plots D1 and D2 are identified as being under extreme drought stress. This is also consistent with the experimental design in practice. It can be concluded that the NDVI polynomial model can effectively estimate the LAI of winter wheat during the heading-filling stage and can be used to monitor drought stress levels for winter wheat during this growth stage based on the calibrated thresholds. During the grain-filling to maturity stage, plots D5, X4, and D3 are identified as being under mild, moderate, and severe drought stress, respectively, while plots D1 and D2 are identified as being under extreme drought stress. This is also consistent with the experimental design in practice. It can be concluded that the RVI polynomial model can effectively estimate the LAI of winter wheat during the grain-filling to maturity stage and can be used to monitor drought stress levels for winter wheat during this growth stage based on the calibrated thresholds.

Based on the LAI derived from UAV multispectral remote sensing imagery and the corresponding threshold table, a total of 800 sample points were randomly selected within a 100 m radius of two soil moisture sensors located in other field areas outside the experimental plot (400 sample points for each sensor). These sample points were used to verify the accuracy of drought stress level identification, and the results were compared with the drought stress levels recorded by the soil moisture sensors for validation. During the jointing-heading stage, a total of 742 sample points correctly identified the drought stress levels, with an accuracy of 92.8%. During the heading-filling stage, 749 sample points were correctly identified, resulting in an accuracy of 93.6%. During the grain-maturity stage, 724 sample points were correctly identified, with an accuracy of 90.5%. The overall identification accuracy exceeded 92.4%.

It should be noted that the above description is only intended to illustrate the technical aspects of the present invention and should not be construed as limiting. Although the invention has been described in detail with reference to preferred embodiments, those skilled in the art will understand that modifications or equivalent substitutions may be made to the technical solution of the present invention without departing from the spirit and scope of the invention.

The invention claimed is:

1. A rapid Unmanned Aerial Vehicle (UAV)-based monitoring and identification method for winter wheat drought levels based on Leaf Area Index (LAI), characterized by the following steps:

1) data collection: this includes acquiring multispectral image data using UAV-based multi-payload low-altitude remote sensing technology, as well as ground-measured LAI data; vegetation indices are calculated from the multispectral image data, including Normalized Difference Vegetation Index (NDVI), Difference Vegetation Index (DVI), Ratio Vegetation Index (RVI), Enhanced Vegetation Index (EVI), Optimized Soil-Adjusted Vegetation Index (OSAVI), and Transformed Chlorophyll Absorption in Reflectance Index (TCARI);

in step 1), the ground-measured LAI is obtained using a portable plant canopy analyzer; for each plot, 22 measurements are taken, and a LAI value is calculated using these 22 measurements as input data;

2) constructing LAI inversion models for different growth stages of winter wheat under varying drought levels: soil background pixels are removed, and pure canopy vegetation index pixels of winter wheat are extracted: the vegetation indices NDVI, DVI, RVI, EVI, OSAVI, and TCARI are each used to construct 4 types of regression equations with the measured LAI data at different growth stages: the regression equation that shows a highest correlation with the ground-measured LAI data for each growth stage is selected as an optimal model equation for that stage: the different growth stages considered include jointing-heading stage, heading-filling stage, and filling-maturity stage of winter wheat: the 4 types of regression equations include linear regression, exponential regression, logarithmic regression, and polynomial regression;

in step 2), the optimal model equation for the jointing-heading stage is a polynomial regression equation between DVI and LAI: the optimal model equation for the heading-filling stage is a polynomial regression equation between NDVI and LAI, and the optimal model equation for the filling-maturity stage is a polynomial regression equation between RVI and LAI, where LAI represents a leaf area index;

3) calibration of LAI thresholds for different drought levels: based on the optimal model equations obtained in step 2) for each growth stage, the LAI is inverted for each stage, and the LAI thresholds are calibrated for different drought levels;

4) real-time drought level identification: multispectral images of a target field are acquired through real-time monitoring, and required vegetation indices are calculated: these vegetation indices are then applied to a corresponding optimal model equation, as determined in step 2), for a relevant growth stage to invert and obtain the LAI: the resulting LAI value is then compared with the thresholds determined in step 3) for that particular growth stage, allowing for the identification of the real-time drought level.

2. The rapid UAV-based monitoring and identification method for winter wheat drought levels based on LAI according to claim 1, characterized in that: in step 1), the acquisition of multispectral image data is conducted by employing a quadrotor UAV equipped with a multispectral camera to capture multispectral aerial images: a flight altitude is set at 55 m, resulting in a ground resolution of 4 cm: the camera captures wavelengths in blue band, green band, red band, red-edge band, and near-infrared band.

3. The rapid UAV-based monitoring and identification method for winter wheat drought levels based on LAI according to claim 1, characterized in that: in step 3), the calibrated LAI thresholds for different drought severity levels are: for the jointing-heading stage, Normal: LAI>2.8:

Mild drought: 2.3 to 2.8: Moderate drought: 1.7 to 2.3: Severe drought: LAI<1.7; for the heading-filling stage, Normal: LAI>4.2: Mild drought: 3.6 to 4.2; Moderate drought: 3.2 to 3.6; Severe drought: LAI<3.2; for the filling-maturity stage, Normal: LAI>5.17; Mild drought: 4.74 to 5.17; Moderate drought: 4.3 to 4.74; Severe drought: LAI<4.3.

4. The rapid UAV-based monitoring and identification method for winter wheat drought levels based on LAI according to claim 1, characterized in that: in step 3), a calibration method for determining the LAI thresholds for different drought levels is as follows: first, calculate an average value of inversion results for each drought level plot; then, calculate a median value between average values of two adjacent drought levels, which is used as the threshold between those adjacent drought levels.

* * * * *